(12) United States Patent
Carlson et al.

(10) Patent No.: US 10,799,959 B2
(45) Date of Patent: Oct. 13, 2020

(54) ROTARY POWER TOOL INCLUDING THREADED BIT ATTACHMENT

(71) Applicant: MILWAUKEE ELECTRIC TOOL CORPORATION, Brookfield, WI (US)

(72) Inventors: Mitchell Carlson, Lisbon, WI (US); Terry L. Timmons, Milwaukee, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 45 days.

(21) Appl. No.: 15/902,504

(22) Filed: Feb. 22, 2018

(65) Prior Publication Data

US 2018/0243888 A1 Aug. 30, 2018

Related U.S. Application Data

(60) Provisional application No. 62/463,219, filed on Feb. 24, 2017.

(51) Int. Cl.
*B23B 51/04* (2006.01)
*B23B 45/00* (2006.01)

(52) U.S. Cl.
CPC ........ *B23B 51/0473* (2013.01); *B23B 45/003* (2013.01); *B23B 51/0406* (2013.01)

(58) Field of Classification Search
CPC ....... B23B 45/003; B23B 45/02; B23B 45/00; B23B 51/0473; B23B 51/0406; B23B 51/12; Y10T 279/3418; Y10T 279/3406; B25B 21/007

See application file for complete search history.

(56) References Cited

U.S. PATENT DOCUMENTS

| | | | | |
|---|---|---|---|---|
| 2,562,327 A | * | 7/1951 | Moore | B24B 45/00 451/342 |
| 2,917,975 A | | 12/1959 | Webster | |
| 3,162,283 A | * | 12/1964 | Saul | B23B 31/38 192/34 |
| 3,464,655 A | | 9/1969 | Schuman | |
| 3,784,316 A | | 1/1974 | Bittern | |
| 3,837,759 A | * | 9/1974 | Bittern | B23B 51/0473 408/204 |
| 4,303,357 A | | 12/1981 | Makar | |

(Continued)

FOREIGN PATENT DOCUMENTS

| | | | | |
|---|---|---|---|---|
| DE | 3214209 A1 | * | 10/1983 | ......... B23B 51/0426 |
| DE | 29505693 | | 7/1996 | |

(Continued)

*Primary Examiner* — Ryan C Rufo
(74) *Attorney, Agent, or Firm* — Michael Best & Friedrich LLP

(57) ABSTRACT

A rotary power tool comprises a drive mechanism, a spindle rotatable about a rotational axis in response to receiving torque from the drive mechanism, and a first shank coupled for co-rotation with the spindle and having a first diameter. The first shank includes a first threaded portion upon which a first tool bit is receivable. A second shank is coupled for co-rotation with the spindle and extends outwardly from and coaxial with the first shank. The second shank has a second diameter that is smaller than the first diameter and a second threaded portion upon which a second tool bit is receivable.

20 Claims, 7 Drawing Sheets

(56) References Cited

U.S. PATENT DOCUMENTS

| | | | |
|---|---|---|---|
| 4,551,045 A | 11/1985 | Bossier | |
| 5,253,961 A * | 10/1993 | Geissler | B23B 31/113 173/71 |
| 5,624,213 A * | 4/1997 | Anderson | B23B 51/0473 144/23 |
| 5,967,709 A * | 10/1999 | Thuesen | B23B 51/0426 408/204 |
| 7,073,992 B2 | 7/2006 | Korb et al. | |
| 7,097,397 B2 | 8/2006 | Keightley | |
| 7,621,703 B2 | 11/2009 | Keightley | |
| D613,779 S | 4/2010 | Baratta | |
| D617,355 S | 6/2010 | Baratta | |
| D617,818 S | 6/2010 | Baratta | |
| D621,857 S | 8/2010 | Baratta | |
| D629,026 S | 12/2010 | Baratta | |
| 7,850,405 B2 | 12/2010 | Keightley | |
| D631,070 S | 1/2011 | Baratta | |
| 7,959,371 B2 * | 6/2011 | Keightley | B23B 31/11 403/348 |
| D653,267 S | 1/2012 | Baratta | |
| 8,245,997 B2 | 8/2012 | Baratta | |
| 8,328,475 B2 * | 12/2012 | Naughton | B23B 31/06 408/204 |
| 8,888,417 B2 | 11/2014 | Jonsson et al. | |
| 8,992,140 B2 | 3/2015 | Keightley | |
| 9,022,703 B2 | 5/2015 | Keightley | |
| 9,486,860 B2 * | 11/2016 | Kazda | B23B 51/0473 |
| 9,789,600 B2 | 10/2017 | Jönsson et al. | |
| 2006/0285934 A1 | 12/2006 | Keightley | |
| 2007/0036620 A1 * | 2/2007 | Keightley | B23B 51/0473 408/204 |
| 2008/0050189 A1 | 2/2008 | Keightley | |
| 2010/0247258 A1 * | 9/2010 | Keightley | B23B 51/0473 408/204 |
| 2010/0290848 A1 | 11/2010 | Baratta | |
| 2011/0170968 A1 * | 7/2011 | Moffatt | B23B 51/0473 408/204 |
| 2015/0352708 A1 | 12/2015 | Taack-Trakranen | |

FOREIGN PATENT DOCUMENTS

| | | | |
|---|---|---|---|
| DE | 29703693 | 5/1997 | |
| DE | 29813306 | 11/1998 | |
| DE | 10064173 | 6/2002 | |
| DE | 202011051462 U1 * | 11/2011 | B23B 31/11 |
| DE | 202014100357 | 4/2014 | |
| EP | 0598218 | 5/1994 | |
| EP | 0894579 | 2/1999 | |
| EP | 0894580 | 2/1999 | |
| GB | 1045426 A * | 10/1966 | B23B 31/113 |
| JP | 09019817 A * | 1/1997 | |
| JP | 2014030867 A * | 2/2014 | |
| WO | 9606714 | 3/1996 | |
| WO | WO-2005000506 A2 * | 1/2005 | B23B 51/0473 |

\* cited by examiner

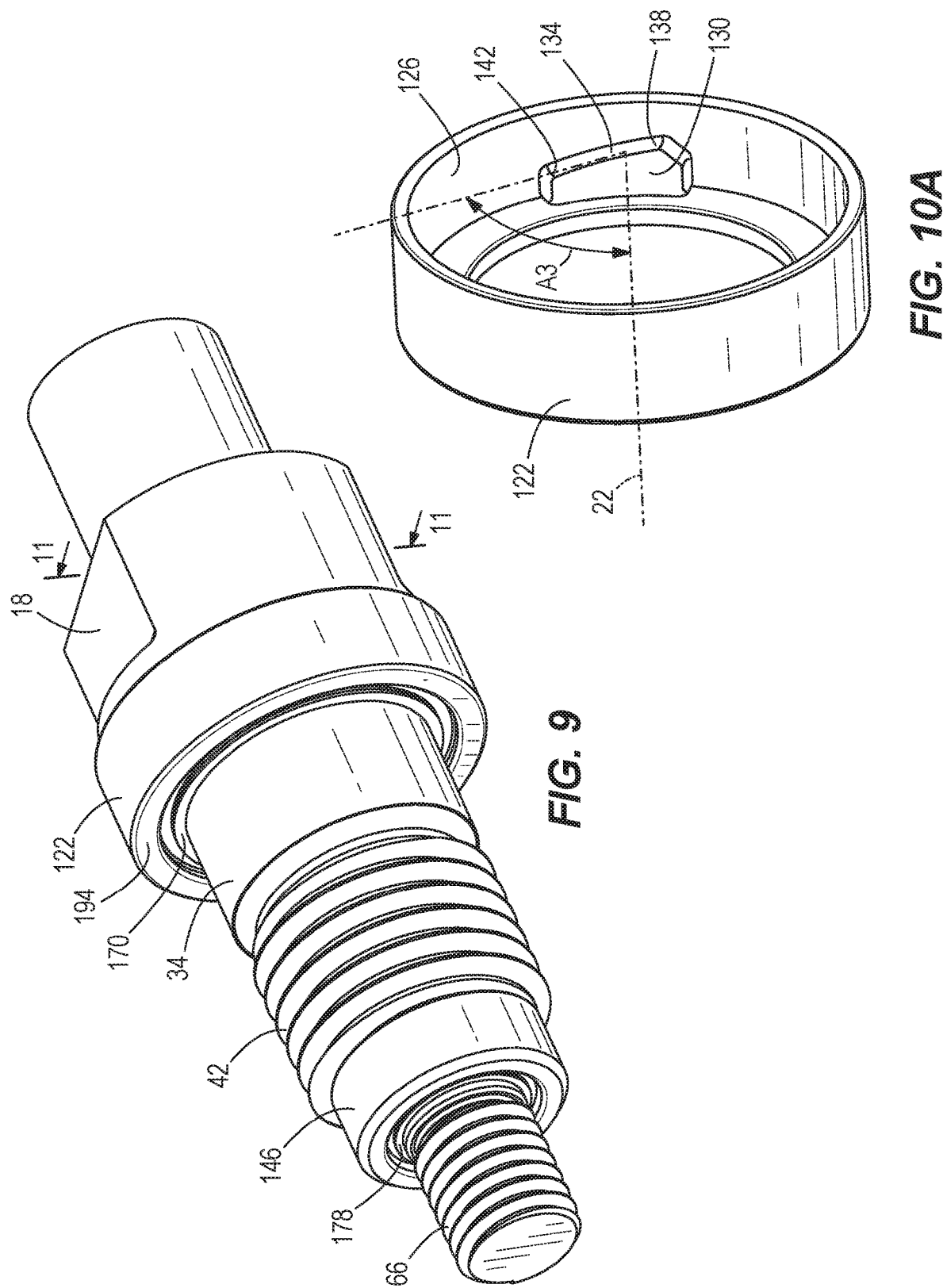

ROTARY POWER TOOL INCLUDING THREADED BIT ATTACHMENT

CROSS-REFERENCE TO RELATED APPLICATIONS

This application claims priority to U.S. Provisional Patent Application No. 62/463,219 filed on Feb. 24, 2017, the entire content of which is incorporated herein by reference.

FIELD OF THE INVENTION

The present invention relates to rotary power tools, and more particularly to rotary power tools including threaded bit attachments for tool bits.

BACKGROUND OF THE INVENTION

When using a rotary power tool such as a core drill, an operator may need to switch between different tool bits having hubs of different diameters. Also, core drills are sometimes used with wet core bits, which are used with a dust-abating wetting system, and dry core bits, which do not require use of the dust-abating wetting system.

SUMMARY OF THE INVENTION

The present invention provides, in one aspect, a rotary power tool comprising a drive mechanism, a spindle rotatable about a rotational axis in response to receiving torque from the drive mechanism, and a first shank coupled for co-rotation with the spindle and having a first diameter. The first shank includes a first threaded portion upon which a first tool bit is receivable. A second shank is coupled for co-rotation with the spindle and extends outwardly from and coaxial with the first shank. The second shank has a second diameter that is smaller than the first diameter and a second threaded portion upon which a second tool bit is receivable.

The present invention provides, in another aspect, a rotary power tool comprising a drive mechanism, a spindle rotatable about a rotational axis in response to receiving torque from the drive mechanism, and a first shank coupled for co-rotation with the spindle. The first shank has a first diameter and includes a first threaded portion upon which a first tool bit is receivable. The rotary power tool also comprises a first quick release mechanism for attaching and removing the first tool bit to the first threaded portion in a tool-free manner. The rotary power tool also comprises a second shank coupled for co-rotation with the spindle and extending outwardly from and coaxial with the first shank. The second shank has a second diameter that is smaller than the first diameter and a second threaded portion upon which a second tool bit is receivable. The rotary power tool also includes a second quick release mechanism for attaching and removing the second tool bit to the second threaded portion in a tool-free manner.

Other features and aspects of the invention will become apparent by consideration of the following detailed description and accompanying drawings.

BRIEF DESCRIPTION OF THE DRAWINGS

FIG. 9 is a perspective view of the spindle of FIG. 8, with a first collar and a second collar attached.

FIG. 10A is a perspective view of the first collar of FIG. 9.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
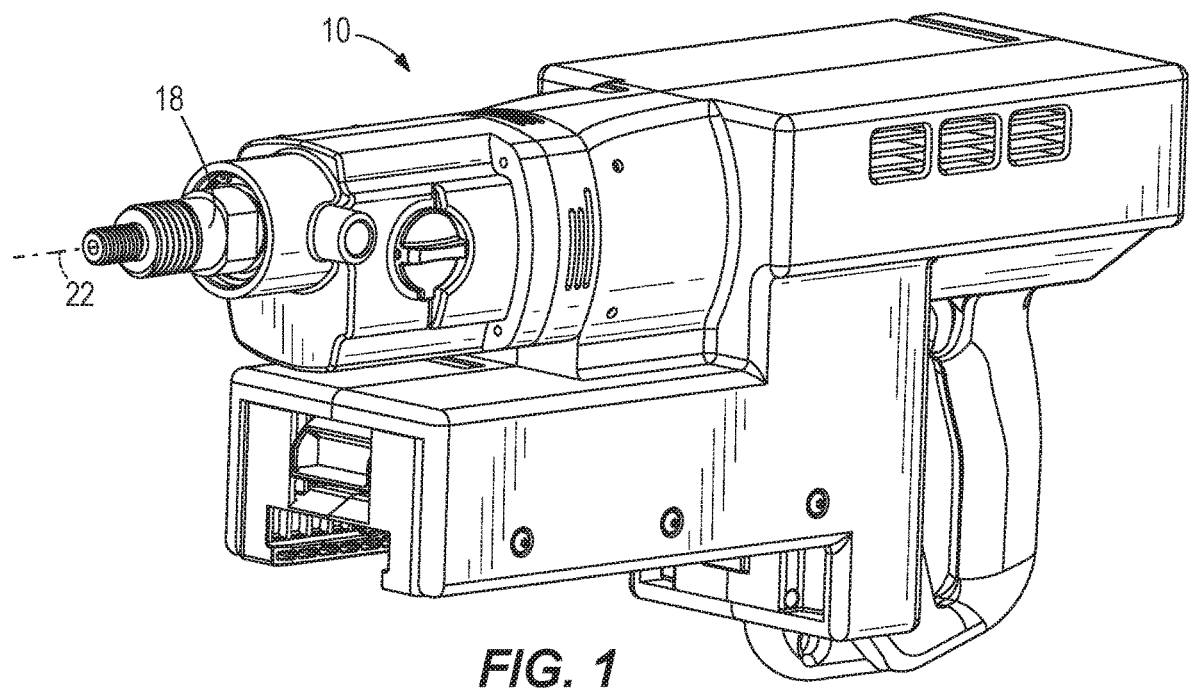
FIG. 1 is a perspective view of a rotary power tool, such as a core drill, in accordance with an embodiment of the invention.
Figure 2:
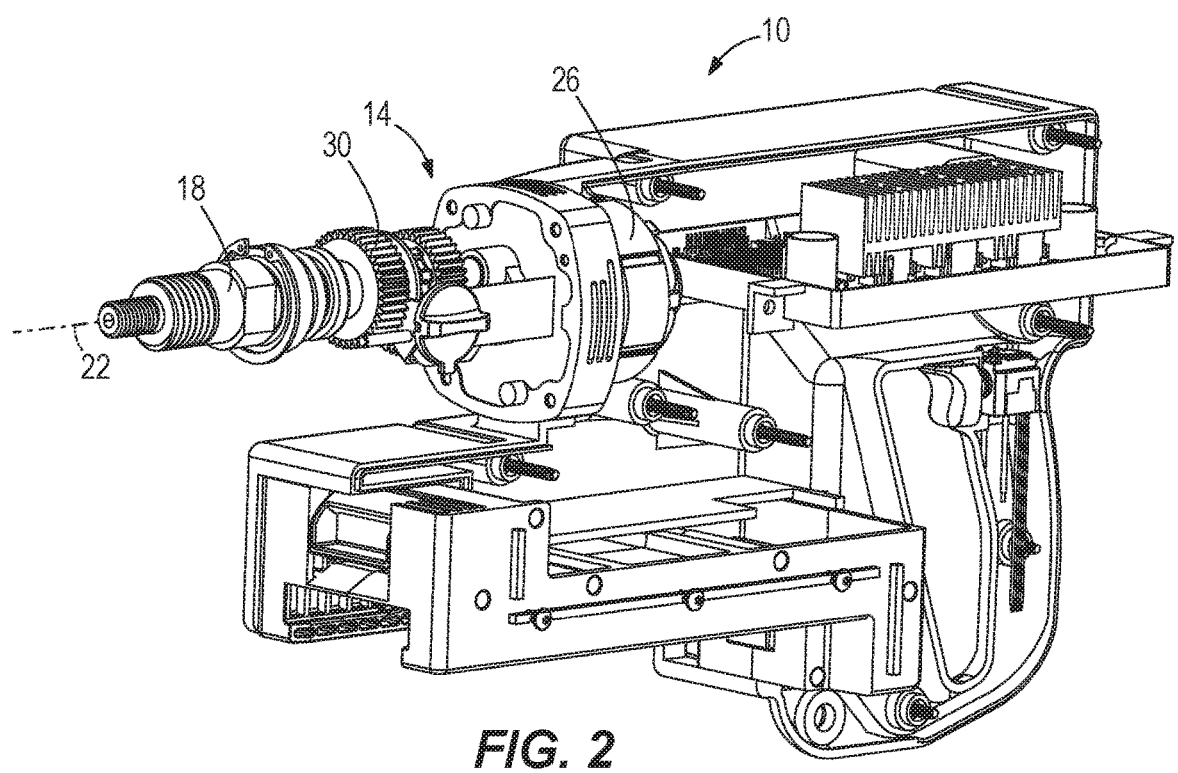
FIG. 2 is a perspective view of the core drill of FIG. 1, with portions removed.

With reference to FIGS. 1 and 2, a rotary power drill, such as core drill 10, includes a drive mechanism 14 and a spindle 18 rotatable about a rotational axis 22 in response to receiving torque from the drive mechanism 14. As shown in FIG. 2, the drive mechanism 14 includes an electric motor 26 and a multi-speed transmission 30 between the motor 26 and the spindle 18. The core drill 10 may be powered by an on-board power source (e.g., a battery, not shown) or a remote power source (e.g., an alternating current source) via a cord (also not shown).

Figure 3:
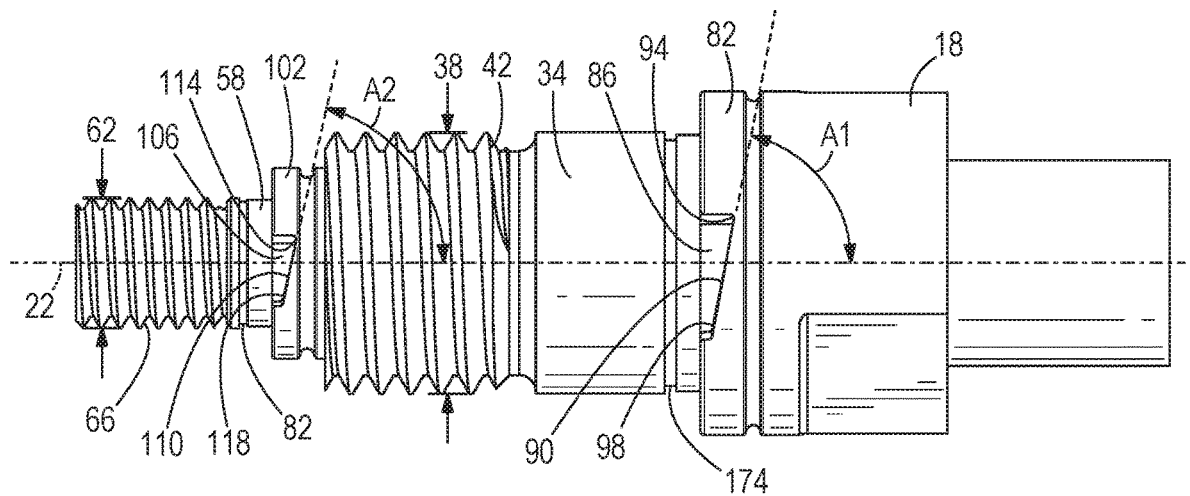
FIG. 3 is a plan view of a spindle of the core drill of FIG. 1.
Figure 4:
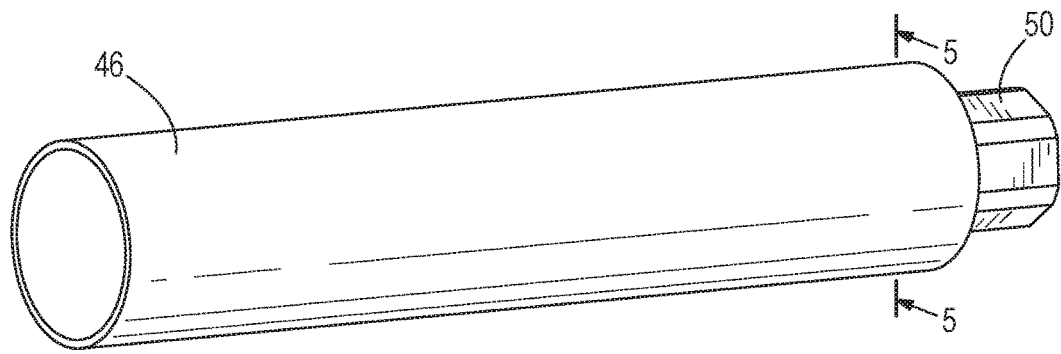
FIG. 4 is a perspective view of a first tool bit for use with the core drill of FIG. 1
Figure 5:
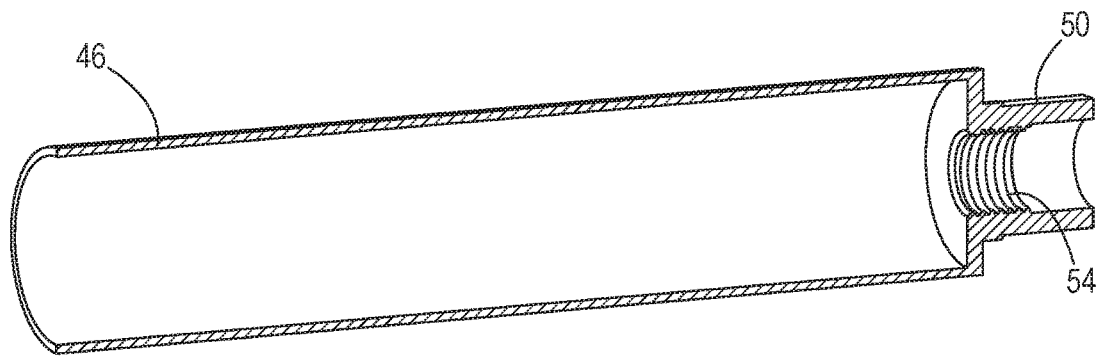
FIG. 5 is a cross-sectional view of the first tool bit of FIG. 4.

With reference to FIG. 3, the spindle 18 includes a first shank 34 coupled for co-rotation therewith. The first shank 34 has a first diameter 38 and includes a first threaded portion 42 upon which a first tool bit 46 is receivable. With reference to FIGS. 4 and 5, the first tool bit 46 includes a hub 50 having a set of internal threads 54 that thread onto the first threaded portion 42 of the first shank 54. The first tool bit 46 is a wet core bit intended for use with a dust-abating wetting system of the core drill 10.

Figure 6:
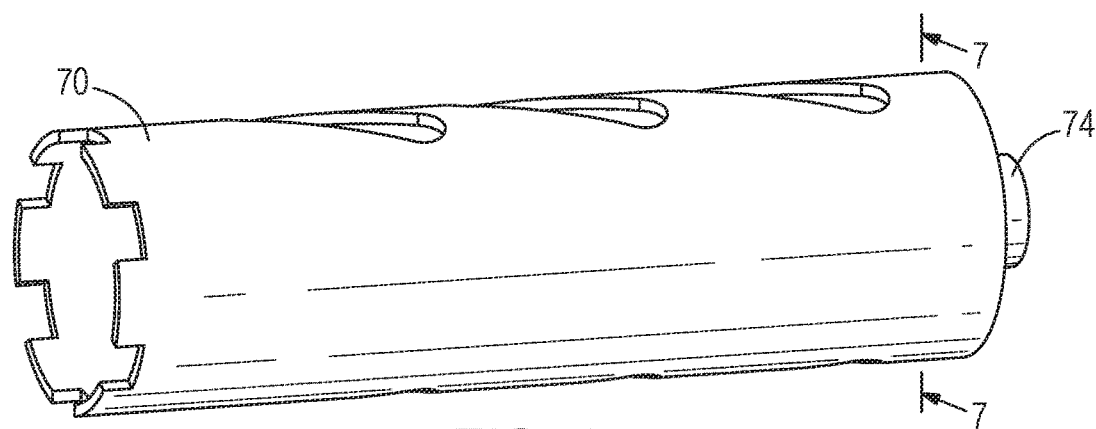
FIG. 6 is a perspective view of a second tool bit for use with the core drill of FIG. 1.
Figure 7:
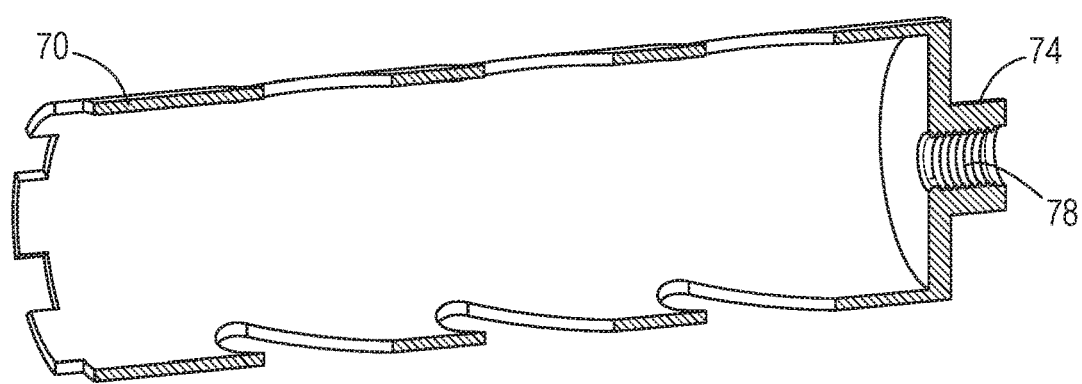
FIG. 7 is a cross-sectional view of the second tool bit of FIG. 6.

With reference to FIG. 3, the spindle 18 also includes a second shank 58 coupled for co-rotation therewith. The second shank 58 extends outwardly from and is coaxial with the first shank 34. The second shank 58 has a second diameter 62 that is smaller than the first diameter 38 and a second threaded portion 66 upon which a second tool 70 bit is receivable. With reference to FIGS. 6 and 7, the second tool bit includes a hub 74 having a set of internal threads 78 that thread onto the second threaded portion 66 of the second shank 58. The second tool bit 70 is a dry core bit intended for use without the dust-abating wetting system of the core drill 10.

Figure 8:
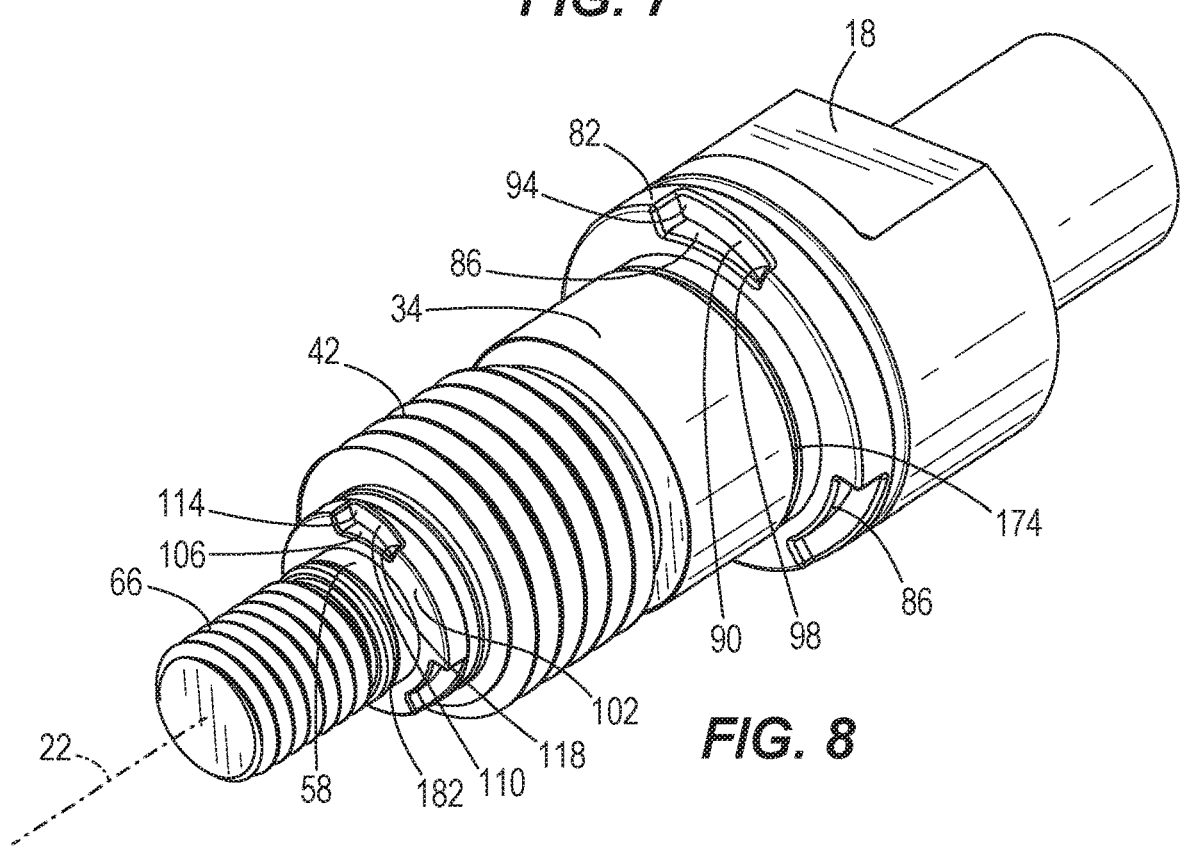
FIG. 8 is a perspective view of the spindle of FIG. 3.

With reference to FIGS. 3 and 8, the spindle 18 includes a first shoulder 82 adjacent the first shank 34. Multiple (e.g., three) notches 86 are defined in the outer circumferential surface of the first shoulder 82. Each of the notches 86 has a variable depth in a direction parallel with the rotational axis 22, defining a ramped surface 90 between a deepest portion 94 of each of the notches 86 and a shallowest portion 98 of each of the notches 86. The ramped surfaces 90 of the notches 86 are inclined relative to the rotational axis 22 of the spindle by an included angle A1. The angle A1 is greater than 0 degrees but less than 90 degrees. In one embodiment, the angle A1 may be between 70 degrees and 80 degrees. In another embodiment, the angle A1 may be about 78 degrees. The orientations of the ramped surfaces 90 are opposite to the right-handed thread configuration of the first threaded portion 42.

The spindle 18 also includes a second shoulder 102 adjacent the second shank 58. Multiple (e.g., three) notches 106 are defined in the outer circumferential surface of the second shoulder 102. Each of the notches 106 has a variable depth in a direction parallel with the rotational axis 22, defining a ramped surface 110 between a deepest portion 114 of each of the notches 106 and a shallowest portion 118 of each of the notches 106. The ramped surfaces 110 of the notches 106 are inclined relative to the rotational axis 22 of the spindle by an included angle A2. The angle A2 is greater than 0 degrees but less than 90 degrees. In one embodiment, the angle A2 may be between 70 degrees and 80 degrees. In another embodiment, the angle A2 may be about 78 degrees. The orientations of the ramped surfaces 110 are opposite to the right-handed thread configuration of the second threaded portion 66.

Figure 10B:
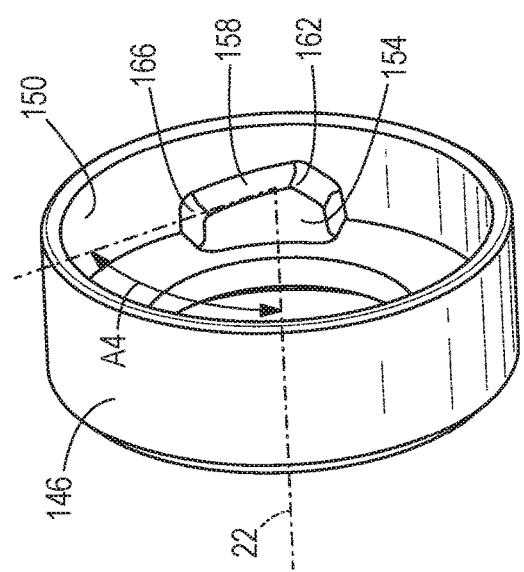
FIG. 10B is a perspective view of the second collar of FIG. 9.
Figure 11:
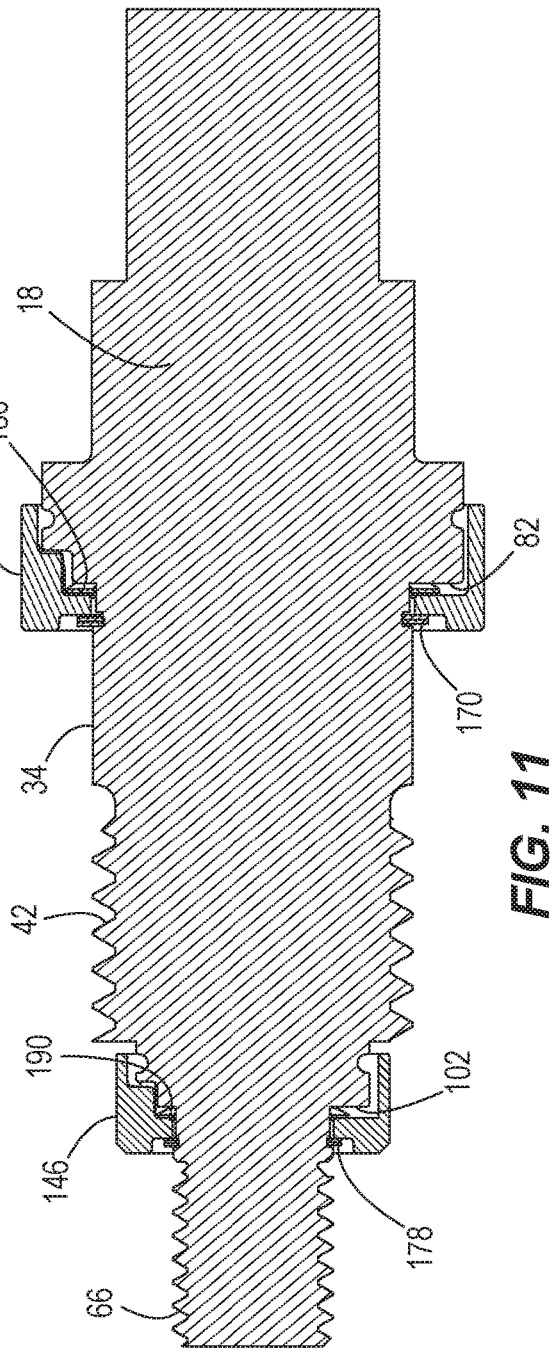
FIG. 11 is a longitudinal cross-sectional view of the spindle of FIG. 9.
Figure 12:
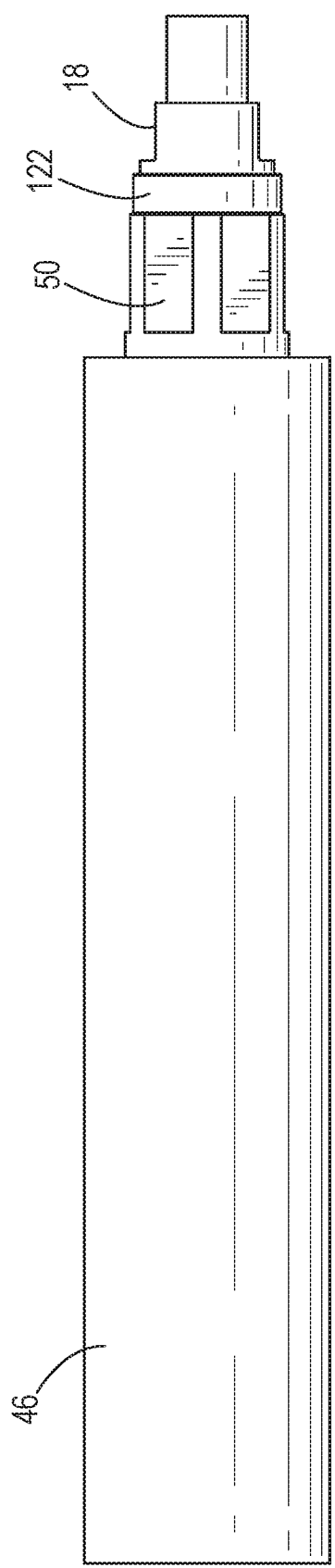
FIG. 12 is a plan view of the first tool bit attached to the spindle of FIG. 9.
Figure 13:
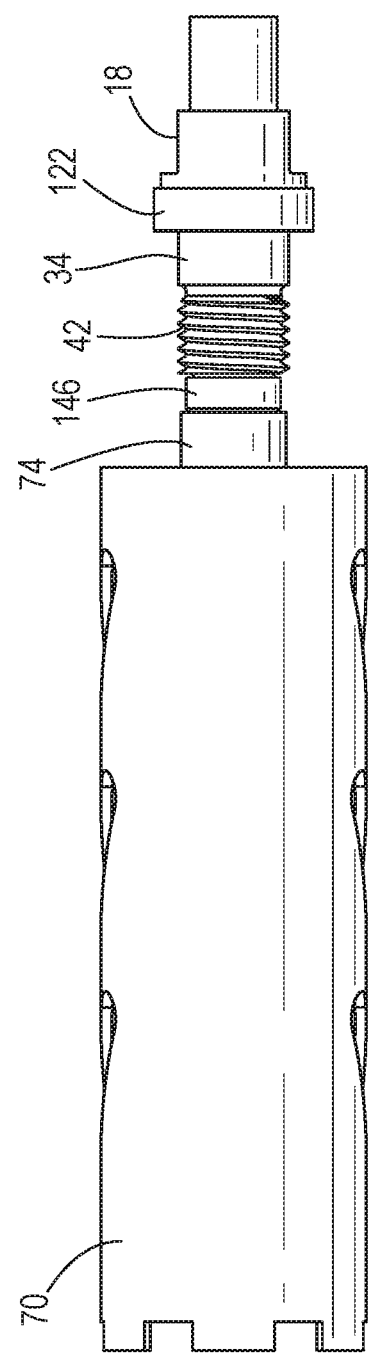
FIG. 13 is a plan view of the second tool bit attached to the spindle of FIG. 9.
Figure 14:
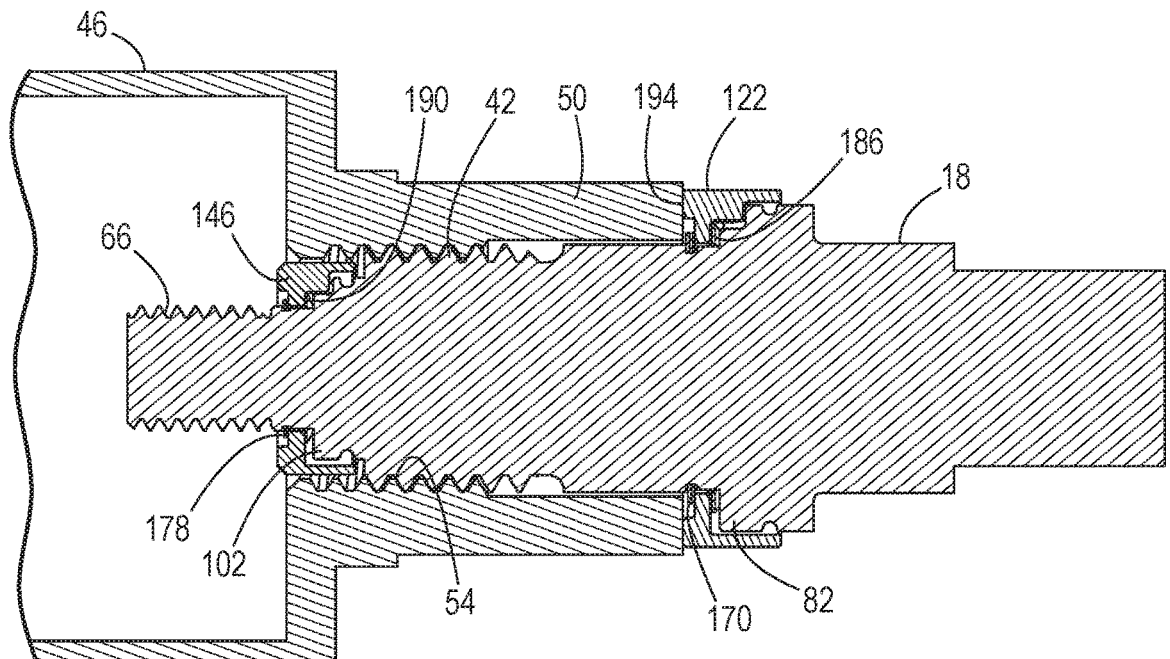
FIG. 14 is a cross-sectional view of the first tool bit attached to the spindle of FIG. 12.
Figure 15:
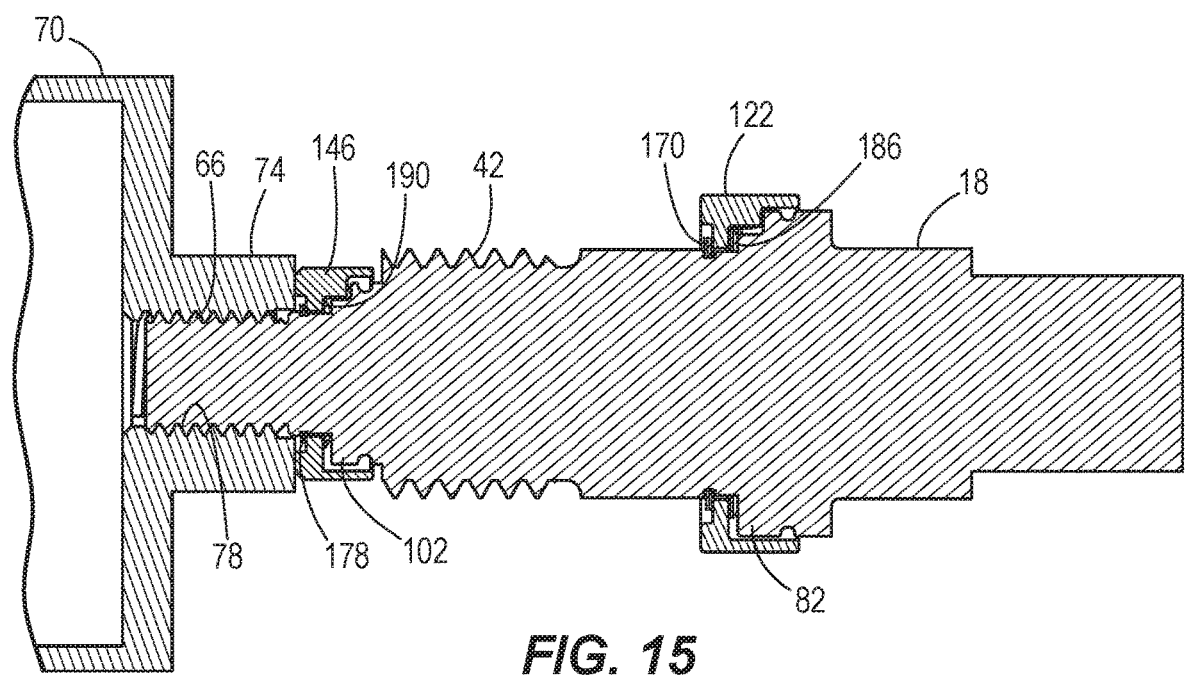
FIG. 15 is a cross-sectional view of the second tool bit attached to the spindle of FIG. 13.

With reference to FIGS. 9-11, a first collar 122 is arranged about the first shank 34 and the first shoulder 82. The first collar 122 includes an internal surface 126 having multiple (e.g., three) radially inward-extending protrusions 130. Each of the protrusions 130 has a variable height in a direction parallel with the rotational axis 22, defining a ramped surface 134 between a tallest portion 138 of each of the protrusions and a shortest portion 142 of each of the protrusions 130. The ramped surfaces 134 of the protrusions 130 are inclined relative to the rotational axis 22 of the spindle by an included angle A3 that is identical to angle A1. The orientations of the ramped surfaces 134 are opposite to the right-handed threaded orientation of the first threaded portion 42. As is explained in greater detail below, the ramped surfaces 134 of the protrusions 130 are configured to slide along the ramped surfaces 90 of the notches 86.

With continued reference to FIGS. 9-11, a second collar 146 is arranged about the second shank 58 and the second shoulder 102. The second collar 146 includes an internal surface 150 having multiple (e.g., three) radially inward-extending protrusions 154. Each of the protrusions 154 has a variable height in a direction parallel with the rotational axis 22, defining a ramped surface 158 between a tallest portion 162 of each of the protrusions 154 and a shortest portion 166 of each of the protrusions 154. The ramped surfaces 158 of the protrusions 154 are inclined relative to the rotational axis 22 of the spindle by an included angle A4 that is identical to angle A2. The orientations of the ramped surfaces 158 are opposite to the right-handed threaded orientation of the second threaded portion 66. As is explained in greater detail below, the ramped surfaces 158 of protrusions 154 are configured to slide along the ramped surfaces 110 of the notches 106. In alternative embodiments, the protrusions 130 may be located on the first shoulder 82 and the notches 86 may be defined in the first collar 122, and the protrusions 154 may be located on the second shoulder 102 and the notches 106 may be defined in the second collar 146.

With reference to FIGS. 9 and 11, a first retainer ring 170 is arranged about the first shank 34 and is axially affixed to the first shank 34 via a first circumferential groove 174 about the first shank 34. A second retainer ring 178 is arranged about the second shank 58 and is axially affixed to the second shank 58 via a second circumferential groove 182 about the second shank 58. With reference to FIG. 11, a first biasing member, such as a wave spring 186, is arranged about the first shank 34 for biasing the first collar 122 against the first retainer ring 170. Likewise, a second biasing member, such as a wave spring 190, is arranged about the second shank 58 for biasing the second collar 146 against the second retainer ring 178. The first collar 122, first biasing member 186, and first retainer ring 170 are collectively referred to herein as a first quick release mechanism for the first tool bit 46. Likewise, the second collar 146, second biasing member 190, and second retainer ring 178 are collectively referred to herein as a second quick release mechanism for the second tool bit 70.

When the collars 122, 146 are attached to the respective shoulders 82, 102 of the spindle 18, the protrusions 130, 154 are received within the respective notches 86, 106. The circumferential length of the protrusions 130 on the first collar 122 is less than that of the notches 86 in the first shoulder 82; therefore, the first collar 122 is rotatable relative to the first shoulder 82 by an amount equal to the difference between the circumferential lengths. Likewise, the circumferential length of the protrusions 154 on the second collar 146 is less than that of the notches 106 in the second shoulder 102; therefore, the second collar 146 is rotatable relative to the second shoulder 102 by an amount equal to the difference between the circumferential lengths.

In operation of the first quick release mechanism, for example, the first collar 122 is rotatable between a first position, in which the tallest portions 138 of each of the protrusions 130 are proximate the deepest portions 94 of the respective notches 86 in the first shoulder 82, and a second position, in which the tallest portions 138 of each of the protrusions 130 are moved away from the deepest portions 94 of the respective notches 86. Prior to attaching the first tool bit 46 to the first threaded portion 42, the first collar 122 is located in the first position. Then, as the first tool bit 46 is threaded to the first threaded portion 42, the rear end of the hub 50 contacts an end face 194 of the first collar 122. Thereafter, continued rotation of the first tool bit 46 relative to the first threaded portion 42 causes the first collar 122 to rotate in unison with the first tool bit 46 away from the first position and toward the second position.

When the first collar 122 is rotated from the first position to the second position, the ramped surfaces 134 of the protrusions 130 slide along the ramped surfaces 90 of the notches 86. Because the ramped surfaces 134, 90 of the protrusions 130 and notches 86, respectively, are inclined relative to the rotational axis 22 of the spindle, the protrusions 130 become wedged in the notches 86, imparting an increasing clamping force to the first tool bit 46 as it is further tightened onto the first threaded portion 42. Such a clamping force is oriented normal to both the rear end of the hub 50 of the first tool bit 46 and the end face 194 of the first collar. Prior to or coinciding with the shortest portions 142 of the respective protrusions 130 reaching the shallowest portions 98 of the respective notches 86, the clamping force exerted on the first tool bit 46, and the resultant frictional force developed between the first tool bit 46 and the first collar 122, prevents further tightening of the first tool bit 46 onto the first threaded portion 42.

During use of the core drill 10 to perform a drilling operation with the first tool bit 46 (i.e., a wet bit), the first quick release mechanism impedes further tightening of the first tool bit 46 onto the first threaded portion 42 of the spindle 18, making it less likely that the first tool bit 46 will seize onto the first shank 34 after a drilling operation has concluded.

When the operator of the core drill desires to remove the first tool bit 46, the operator needs only to grasp the first tool bit 46 and unthread it from the spindle 18 (with rotation of the spindle 18 being locked manually using hand tools or an internal spindle lock mechanism). Because the first collar 122 is located in the second position with the tallest portions 138 of the respective protrusions 130 spaced from the deepest portions 94 of the respective notches 86, the first collar 122 rotates in unison with the first tool bit 46 until this spacing is closed. During this time, the clamping force on the first tool bit 46 resulting from the wedged protrusions 130 and notches 86 is progressively reduced, permitting continued unthreading of the first tool bit 46 from the first threaded portion 42 after the first collar 122 is returned to the first position. Now that the frictional force between the first collar 122 and the first tool bit 46 has been removed or reduced, the operator may quickly and easily unthread the set of internal threads 54 of the first tool bit 46 from the first threaded portion 42 of the first shank 34.

The second tool bit 70, which is appropriate for a "dry" drilling operation without dust abatement, is attachable to and removable from the core drill 10 in the same manner as described above using the second quick release mechanism. Thus, the core drill is adaptable for use with different tool bits 46, 70 using a single spindle 18, and additionally provides a tool-free apparatus (i.e., first and second quick release mechanisms) for quickly and easily switching between wet and dry tool bits, or coring operations using bits of different diameter attachment hubs.

Various features of the invention are set forth in the following claims.

What is claimed is:

1. A rotary power tool comprising:
    a drive mechanism;
    a spindle rotatable about a rotational axis in response to receiving torque from the drive mechanism, the spindle including
        a first shoulder,
        a first shank located adjacent and extending outwardly from and coaxial with the first shoulder, the first shank having a first diameter and a first threaded portion upon which a first tool bit is receivable,
        a second shank extending outwardly from and coaxial with the first shank, the first shoulder and the second shank being positioned on opposite sides of the first shank, the second shank having a second diameter that is smaller than the first diameter and a second threaded portion upon which a second tool bit is receivable, the first and second tool bits being used separately for different operations; and
    a first collar arranged about the first shank and the first shoulder,
        wherein one of a first notch or a first protrusion is defined on the first shoulder, and wherein the first collar includes the other of the first notch or the first protrusion,
        wherein the first collar is rotatable and axially displaceable relative to the first shoulder and the first shank when removing the first tool bit.

2. The rotary power tool of claim 1, wherein the first notch includes a variable depth in a direction parallel with the rotational axis, and wherein the first protrusion includes a variable height in a direction parallel with the rotational axis.

3. The rotary power tool of claim 2,
    wherein the first protrusion is slidable within the first notch between a first position in which a tallest portion of the first protrusion is proximate a deepest portion of the first notch, and a second position in which the tallest portion of the first protrusion is moved away from the deepest portion of the first notch; and wherein the rotary power tool further comprises
    a first retainer axially affixed to the first shank; and
    a first biasing member arranged about the first shank and biasing the first collar against the first retainer.

4. The rotary power tool of claim 3, wherein each of the first protrusion and the first notch is defined by a ramp surface that is inclined relative to the rotational axis of the spindle by a first angle.

5. The rotary power tool of claim 3, wherein in response to the first tool bit being rotated in a first rotational direction along the first threaded portion, the first tool bit contacts the first collar, the first collar rotates in the first rotational direction with the first tool bit, the first protrusion moves away from the first position and toward the second position, and the first collar exerts a frictional force on the first tool bit impeding further rotation of the first tool bit along the first threaded portion.

6. The rotary power tool of claim 5, wherein in response to the first tool bit being rotated along the first threaded portion in a second rotational direction that is opposite the first rotational direction, the first collar rotates in the second rotational direction with the first tool bit, the first protrusion moves away from the second position and towards the first position, and the frictional force on the first tool bit is removed or reduced.

7. The rotary power tool of claim 3, wherein the spindle includes:
    a second shoulder adjacent the second shank, and one of a second notch or a second protrusion defined on the second shoulder, wherein the second notch includes a variable depth in a direction parallel with the rotational axis, and wherein the second protrusion includes a variable height in a direction parallel with the rotational axis.

8. The rotary power tool of claim 7, further comprising:
    a second collar arranged about the second shank and the second shoulder, the second collar including the other of the second notch or the second protrusion, the second collar being rotatable and axially displaceable relative to the second shoulder and the second shank, the second protrusion being slidable within the second notch between a first position in which a tallest portion of the second protrusion is proximate a deepest portion of the second notch, and a second position in which the tallest portion of the second protrusion is moved away from the deepest portion of the second notch;
    a second retainer axially affixed to the second shank; and a second biasing member arranged about the second shank and biasing the second collar against the second retainer.

9. The rotary power tool of claim 8, wherein each of the second protrusion and the second notch is defined by a ramp surface that is inclined relative to the rotational axis of the spindle by a second angle.

10. The rotary power tool of claim 8, wherein in response to the second tool bit being rotated in the first rotational direction along the second threaded portion, the second tool bit contacts the second collar, the second collar rotates in the first rotational direction with the second tool bit, the second protrusion moves away from the first position and toward the second position, and the second collar exerts a frictional force on the second tool bit impeding further rotation of the second tool bit along the second threaded portion.

11. The rotary power tool of claim 10, wherein in response to the second tool bit being rotated along the second threaded portion in the second rotational direction, the second collar rotates in the second rotational direction with the second tool bit, the second protrusion moves away from the second position and towards the first position, and the frictional force on the second tool bit is removed or reduced.

12. A rotary power tool comprising:
a drive mechanism;
a spindle rotatable about a rotational axis in response to receiving torque from the drive mechanism, the spindle including
a first shank having a first diameter, the first shank including a first threaded portion upon which a first tool bit is receivable,
a second shank extending outwardly from and coaxial with the first shank, the second shank having a second diameter that is smaller than the first diameter and a second threaded portion upon which a second tool bit is receivable, the first and second tool bits being used separately for different operations;
a first quick release mechanism for attaching and removing the first tool bit to the first threaded portion, the first quick release mechanism including a first shoulder adjacent the first shank and a first collar arranged about the first shank and the first shoulder, wherein one of a first notch or a first protrusion is defined on the first shoulder and the other of the first notch or first protrusion is included on the first collar, the first collar being axially displaceable and rotatable relative to the first shoulder and the first shank, the first collar being rotatable to move the first protrusion relative to the first notch; and
a second quick release mechanism for attaching and removing the second tool bit to the second threaded portion, the second quick release mechanism including a second shoulder adjacent the second shank and a second collar arranged about the second shank and the second shoulder, wherein one of a second notch or a second protrusion is defined on the second shoulder and the other of the second notch or second protrusion is included on the second collar, the second collar being rotatable relative to the second shoulder and the second shank, the second collar being rotatable to move the second protrusion relative to the second notch.

13. The rotary power tool of claim 12, wherein the first quick release mechanism further includes
a first retainer axially affixed to the first shank, and a first biasing member arranged about the first shank and biasing the first collar against the first retainer, and
wherein the second quick release mechanism includes
a second retainer axially affixed to the second shank, and
a second biasing member arranged about the second shank and biasing the second collar against the second retainer.

14. The rotary power tool of claim 13, wherein the first notch includes a variable depth in a direction parallel with the rotational axis, and wherein the first protrusion includes a variable height in a direction parallel with the rotational axis.

15. The rotary power tool of claim 14, wherein the second notch includes a variable depth in a direction parallel with the rotational axis, and wherein the second protrusion includes a variable height in a direction parallel with the rotational axis.

16. The rotary power tool of claim 15, wherein the first protrusion is slidable within the first notch between a first position in which a tallest portion of the first protrusion is proximate a deepest portion of the first notch, and a second position in which the tallest portion of the first protrusion is moved away from the deepest portion of the first notch, wherein in response to the first tool bit being rotated in a first rotational direction along the first threaded portion, the first tool bit contacts the first collar, the first collar rotates in the first rotational direction with the first tool bit, the first protrusion moves away from the first position and toward the second position, and the first collar exerts a frictional force on the first tool bit impeding further rotation of the first tool bit along the first threaded portion.

17. The rotary power tool of claim 16, wherein the second protrusion is slidable within the second notch between a second position in which a tallest portion of the second protrusion is proximate a deepest portion of the second notch, and a second position in which the tallest portion of the second protrusion is moved away from the deepest portion of the second notch, wherein in response to the second tool bit being rotated in the first rotational direction along the second threaded portion, the second tool bit contacts the second collar, the second collar rotates in the first rotational direction with the second tool bit, the second protrusion moves away from the first position and toward the second position, and the second collar exerts a frictional force on the second tool bit impeding further rotation of the second tool bit along the second threaded portion.

18. The rotary power tool of claim 17, wherein in response to the first tool bit being rotated along the first threaded portion in a second rotational direction that is opposite the first rotational direction, the first collar rotates in the second rotational direction with the first tool bit, the first protrusion moves away from the second position and towards the first position, and the frictional force on the first tool bit is removed or reduced, and wherein in response to the second tool bit being rotated along the second threaded portion in the second rotational direction, the second collar rotates in the second rotational direction with the second tool bit, the second protrusion moves away from the second position and towards the first position, and the frictional force on the second tool bit is removed or reduced.

19. The rotary power tool of claim 12, wherein the first collar is rotatable when attaching the first tool bit.

20. The rotary power tool of claim 12, wherein the first collar is rotatable when removing the first tool bit.

* * * * *